(12) United States Patent
Moeller et al.

(10) Patent No.: US 9,769,374 B2
(45) Date of Patent: Sep. 19, 2017

(54) MOTION SENSOR DEVICE AND USE THEREOF

(71) Applicant: Steinel GmbH, Herzebrock (DE)

(72) Inventors: Thomas Moeller, Herford (DE); Richard Capalini, Prelouc (CZ)

(73) Assignee: Steinel GmbH, Herzebrock (DE)

( * ) Notice: Subject to any disclaimer, the term of this patent is extended or adjusted under 35 U.S.C. 154(b) by 0 days.

(21) Appl. No.: 15/129,069

(22) PCT Filed: Mar. 4, 2015

(86) PCT No.: PCT/EP2015/054492
§ 371 (c)(1),
(2) Date: Feb. 23, 2017

(87) PCT Pub. No.: WO2015/144403
PCT Pub. Date: Oct. 1, 2015

(65) Prior Publication Data
US 2017/0195544 A1 Jul. 6, 2017

(30) Foreign Application Priority Data

Mar. 27, 2014 (DE) ........................ 10 2014 104 299

(51) Int. Cl.
*H04N 5/228* (2006.01)
*H04N 5/232* (2006.01)
(Continued)

(52) U.S. Cl.
CPC ..... *H04N 5/23212* (2013.01); *G06K 9/00335* (2013.01); *G06K 9/00624* (2013.01);
(Continued)

(58) Field of Classification Search
None
See application file for complete search history.

*Primary Examiner* — Stephen Coleman
(74) *Attorney, Agent, or Firm* — Bachman & LaPointe, PC

(57) ABSTRACT

A motion sensor device for detecting a detection object in a detection region, with detector means (12) which are arranged in a sensor housing (10) and designed for detecting motions of the detection object, as well as for generating an electronic distance signal (a) and angle signal (phi) corresponding to the detection object, wherein the distance signal (a) corresponds to an instantaneous distance of the detection object from the sensor housing (13) and the angle signal corresponds to an instantaneous position angle (phi) of the detection object in the form of an azimuth angle in a plane of motion of the detection object extending parallel to the ground surface in the installed state of the motion sensor device on a wall and signal processing and control means (14) connected downstream of the detector means are designed for activating a device (11) to be connected downstream of the motion sensor device in dependence on the distance signal and the angle signal, and wherein the signal processing and control means feature detection region determining means (16) with an interface unit (18; 20), which can be adjusted, configured and/or actuated by a user and serves for at least sectionally adjusting and/or defining a boundary of the detection region in the plane of motion, wherein the signal processing and control means feature comparing means (22), which are designed for comparing a distance signal and angle signal generated for a detection object by the detector means with data on a predefined or adjusted boundary of the detection region that can be variably defined and/or adjusted relative to the sensor housing frontally (32) and laterally (30, 34) in the plane of motion, wherein display and/or visualization means (26) are assigned to the interface unit (18) in order to optically display and/or output the boundary.

14 Claims, 3 Drawing Sheets

(51) Int. Cl.
*H04N 5/14* (2006.01)
*G06T 7/20* (2017.01)
*G06K 9/00* (2006.01)
*H04N 5/225* (2006.01)

(52) U.S. Cl.
CPC ............... *G06T 7/20* (2013.01); *H04N 5/144* (2013.01); *H04N 5/23296* (2013.01); *H04N 2005/2255* (2013.01)

MOTION SENSOR DEVICE AND USE THEREOF

BACKGROUND OF THE INVENTION

The present invention relates to a motion sensor device. The present invention furthermore relates to the utilization of such a motion sensor device within a wall or ceiling light.

Motion detection sensors in the form of various detection technologies and corresponding technical principles are known from the prior art, wherein a common and frequent application is the use of such a motion detection sensor for activating a light. For example, it is common practice to utilize so-called PIR (passive infrared) sensors for the motion detection in interior and exterior regions (e.g. referred to a building, on which a corresponding motion sensor device is installed either by itself or in connection with a lighting unit) and to thereby control a lighting system, wherein these sensors generate a detection signal based on detected infrared radiation in the detection region (more precisely: infrared radiation in the map of the detection region, which changes due to the motion of an object to be detected) and activate a downstream consumer as a reaction thereto. However, devices of this type, which are based on the infrared principle, also have certain disadvantages; first of all, an effective detection region, i.e. a region defined by the maximum distance of a detection object with a certain minimum size to be reliably detected, is limited due to the principle used. In addition, infrared-based sensors can be affected by environmental influences such as, e.g., changes in the temperature and/or light conditions and therefore cause potentially undesirable false activations.

High-frequency or radar sensors are increasingly used as an alternative to the PIR sensor technology, particularly for controlling a lighting system, wherein such sensors operate based on a change of reflected and detected high-frequency waves and to this end typically utilize the Doppler principle, i.e. a frequency shift of the high-frequency signal, which is caused by a motion (or moving speed) of an object to be detected in the detection region and evaluated for the detection. However, this high-frequency technology is—due to the principle used—also associated with certain disadvantages; a detector sensitivity (and therefore also a motion detection sensitivity) is dependent on the (moving) direction, in which the detection object moves relative to the sensor. For example, an object motion in the direction toward the sensor or radially away from this sensor causes a completely different Doppler signal than an object moving tangentially in the detection region. In addition, the difference between a relatively small detection object moving in the vicinity of the sensor and a relatively large object moving at a greater distance from the sensor (and potentially even outside a desired detection region) is difficult to detect with such a sensor and therefore also creates problems. Furthermore, the ability of high-frequency signals to penetrate materials leads to undesirable properties of the motion sensor; the motion sensor may, if applicable, also react to motions that take place behind a wall or similar partition and are irrelevant to a detection function.

In order to overcome the disadvantages of high-frequency motion detector means, DE 10 2012 103 177 A1 of the applicant, which is considered as most closely related prior art, proposes to activate and evaluate two Doppler high-frequency detectors, which are spaced apart from one another, such that not only a simple Doppler signal can be obtained from a combined detector signal and evaluated for the motion detection, but an angle signal in the form of an instantaneous position angle of a detection object, as well as a distance signal in the form of an instantaneous distance of the detection object from an assigned sensor housing, can also be generated with this technology. In this case, it is possible to evaluate and specify, for example, a defined maximum distance of the detection object from the sensor housing from an evaluation of these obtained signals such that the motion sensor device can in this respect operate in a detection mode, which is insensitive to the above-described interfering influences, and has a precise and reproducible detection behavior.

However, the technology described in DE 10 2012 103 177 A1 is still in need of improvement with respect to its configurability and user-friendliness; for example, it is difficult for a user of such a known exterior sensor device to adjust or define a detection region in a plane of motion, which is not arcuate and radially symmetrical to the sensor housing as starting point for the sensor functionality. This means that the known technology is also not particularly well suited for use in the field of consumer goods, in which not only low manufacturing costs, but also a simple operation, preferably without the need for instructions or user manuals, can be a critical success factor.

SUMMARY OF THE INVENTION

The present invention therefore is based on the objective of realizing a motion sensor device such that it is more user friendly, can be easily handled and, in particular, arbitrarily and flexibly configured by untrained or easily trainable users, wherein it should also be possible, in particular, to adjust detection regions that are not realized symmetrical— e.g. referred to a center axis protruding into the detection region—and to configure complex detection regions or detection regions that cannot be simply mapped with straight lines.

This objective is attained by means of a motion sensor device with the characteristics disclosed herein. Advantageous enhancements of the invention are also described herein. The invention furthermore claims protection for the utilization of the inventive motion sensor device within a wall or ceiling light or for activating such a wall or ceiling light, wherein a corresponding activation or control function can be triggered as part of this utilization via a suitable (wire-bound or wireless) connection between the motion sensor device and the light.

The inventive motion sensor device advantageously utilizes detector means that are designed for generating electronic distance and angle signals corresponding to the detection object. According to the invention, the distance signal corresponds to an instantaneous distance of the detection object from the suitable sensor electronics, as well as any antennas of the sensor housing accommodating the detector means. The inventive angle signal likewise corresponds to an instantaneous position angle of the detection object in a plane of motion of the detection object (advantageously referred to a reference line of the type described, for example, by a reference surface of the sensor housing). In the context of the invention, the plane of motion once again preferably corresponds to the base (ground) surface (which is assumed to be planar or flat) or a plane extending parallel thereto; in the practical realization of the invention, the inventive plane of motion would insofar describe a plane that extends parallel to the ground and at the height of a mounting of the sensor housing.

Detector means of this type are preferably realized in the form of high-frequency detector means, wherein the associated disclosure of DE 10 2012 103 177 A1 is with respect to the realization of these high-frequency detector means incorporated into the present application by reference; this technology (which once again is assumed to represent the most closely related prior art) describes how the inventive distance and angle signals can be obtained in the realization (in addition to other output signals). However, the present invention is not limited to such high-frequency detector means for realizing the inventive detector means, but other detector means, which generate the required inventive distance signal and angle signal, may in fact also be used; accordingly, an image acquisition system, for example, may be considered as a potential technological alternative, wherein this image acquisition system is realized, e.g., in the form of two stereoscopic cameras, which are spaced apart from one another by a known distance, and likewise capable of generating the inventive signals. In this case, such image acquisition and image processing systems may operate in the range of visible light or alternatively in the invisible spectral range, e.g. in the infrared range.

According to the invention, signal processing and control means are connected downstream of these detector means and conventionally activate a device to be connected downstream of the motion sensor device (which itself is not necessarily object of the invention) in dependence on the distance signal and on the angle signal. According to the invention, the signal processing and control means feature detection region determining means with an interface unit that can be adjusted, configured and actuated by a user, wherein said interface unit enables the user to influence the detection region and to suitably specify and/or define this detection region.

According to the invention, these signal processing and control means advantageously feature comparing means designed for comparing distance and angle signals generated by the detector means for a detection object with data on a predefined or adjusted boundary of the detection region. This predefinable or adjustable boundary of the detection region can be defined or adjusted relative to the sensor housing frontally (i.e. referred to a normal extending from the sensor housing surface), as well as laterally, in the plane of motion such that the user can flexibly vary the detection region in accordance with the respective situation.

In this context, it is preferred to realize the interface unit, as well as the comparing means, in such a way that a boundary extending over an angle of at least 150°, preferably at least 170°, in the plane of motion (or parallel thereto) can be adjusted; in this way, the detection region can be mapped extensively (with respect to its surface area).

According to an advantageous enhancement of the invention, the function of the interface unit and adjustments thereon or thereby also make it possible for the boundary to feature in the plane of motion a first arcuate section with a first arc shape and (at least) one second arcuate section with a second arc shape that differs from the first arc shape. These arc shapes are preferably connected to one another in order to form a continuous curve, wherein this has the advantageous effect that the inventive flexible variability can be realized in the detection region frontally as well as laterally in an easily reproducible and easily implementable fashion. In this context, it is furthermore preferred to sectionally realize these respective arc shapes in an arcuate, elliptical or paraboloidal fashion; these arc shapes not only allow a mathematically simple constructive design of the geometry (with correspondingly reduced demands on a computer elevation during comparison operations within the inventive comparing means), but these shapes can also be easily reproduced and arranged by a user and correspond to many actual geometric circumstances at an operating site.

With respect to the control technology, it is particularly preferred to assign at least two adjusting means, which can be manually actuated by the user, to the interface units, wherein said adjusting means are preferably realized in the form of rotary knobs and/or slider buttons because these components can be easily operated and manufactured; these adjusting means enable the user to adjust the maximum detection distance along a respectively assigned axis extending from the sensor housing in the plane of motion or parallel thereto. These (at least) two axes define an angle of at least 45° relative to one another (in the plane of motion); in practical applications, in which three axes (with respectively assigned rotary knob or slider button) are provided, it is preferred to respectively space these axes apart from one another by 90° such that an overall angle of 180° is then defined in the plane of motion.

In the context of the invention, it is on the one hand advantageous and also preferred to describe a detection region, which can be suitably defined by adjusting a maximum axial distance (e.g., in accordance with the above-described preferred embodiments), by means of curves or (interconnected) curved paths, but it is alternatively or additionally also preferred to realize the boundary of the plane of motion (or a section of this boundary) linearly by suitably configuring the interface unit. This in turn makes it possible to realize such a boundary rectangular, in the form of a polygon or another structure with linear sections (having the same or different lengths); in a mixed variation with the above-described exemplary embodiment with curved shapes, these boundaries may also be realized sectionally curved with the cited exemplary functional shapes.

According to an enhancement, it is once again particularly advantageous with respect to the control to assign display and/or visualization means for optically displaying or outputting the boundary to the interface unit. In the practical realization, for example, the result of the adjustment process, namely a concrete boundary of the detection region, can be displayed to the user on a suitably assigned screen, ideally in connection with a schematic map of the concrete operating environment. Such a screen may in higher-end versions directly form part of the inventive motion sensor device, but may alternatively or additionally also consist of conventional (preferably portable) data processing means such as smartphones, tablets, PCs or the like, which are connected via suitable interfaces, such that a visual output supports the adjustment options. According to another enhancement, it would also be conceivable to replace the adjusting means realized in the form of rotary knobs or slider buttons with the option of enabling the user to completely or sectionally define a boundary by means of gesticulation control or comparable actuations in a complex two-dimensional data input process (such as, e.g., on a touch-sensitive screen, a touchpad or a similar sensor), but these options can also be combined, wherein such input options may according to other embodiments once again be provided directly on the motion sensor device or alternatively or additionally consists of connected (preferably portable) data processing units with corresponding user interfaces.

According to the invention, a sensible and efficient enhancement, particularly for complex operating and device environments, is characterized in that learning and/or set-up means are assigned to the interface unit such that a motion path of a person in the plane of motion is detected and stored as boundary of the detection region by the interface unit in a learning mode effected by means of these learning or set-up means. In the practical realization, the user (operator) would upon activation of such a learning or set-up mode suitably walk along a path in the plane of motion and this path with be tracked, mapped and then interpreted as boundary or boundary shape of the detection region by the inventive motion sensor device such that this boundary shape is then available for the subsequent detection mode.

Although the present invention is particularly suitable for activating and cooperating with lighting devices of various types, the present invention is nevertheless not limited to this advantageous utilization. In fact, the present invention is also suitable for numerous other motion detection functions. Advantageous applications of the invention include, for example, the field of electronic alarm technology, in which an alarm is triggered, e.g., when the detection object reaches or steps into the detection region, as well as marketing applications, traffic monitoring or other contexts, in which potentially relevant detection objects are assigned to different motion and detection positions in the detection region in order to thereby deduce potential preferences (e.g. referred to a plurality of display windows or the like) from the motion behavior of the moving objects. The corresponding evaluation options are potentially unlimited.

BRIEF DESCRIPTION OF THE DRAWINGS

Other advantages, characteristics and details of the invention can be gathered from the following description of preferred exemplary embodiments with reference to the drawings; in these drawings.

DETAILED DESCRIPTION

Figure 1:
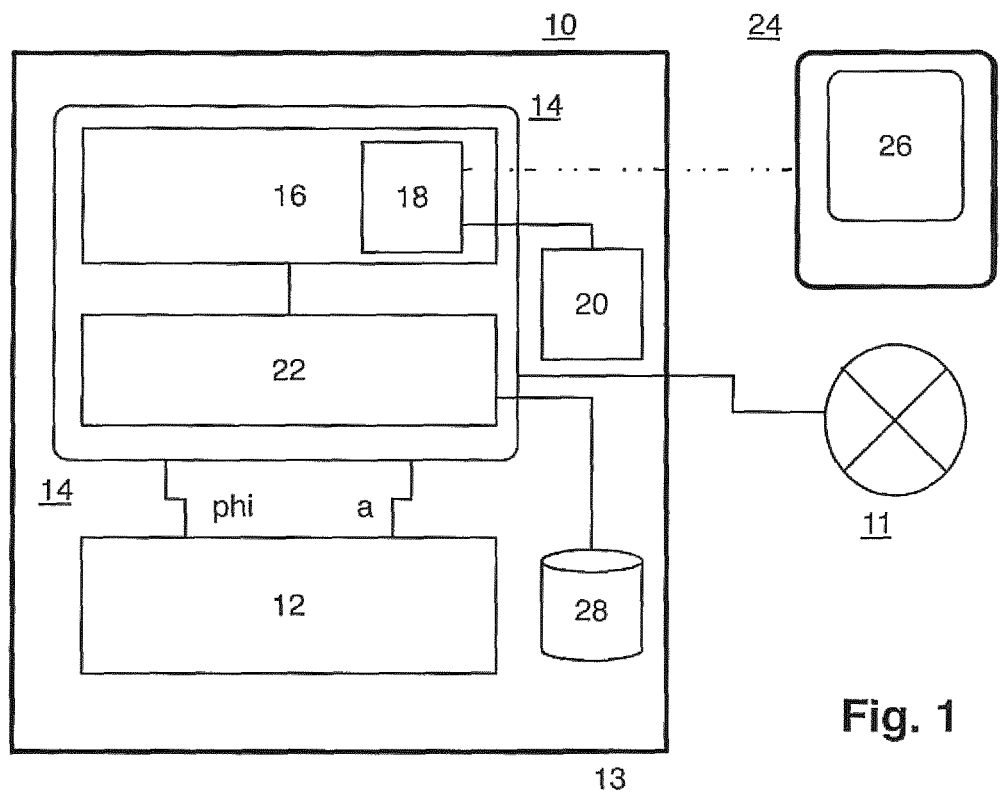
FIG. 1 shows a schematic block diagram of a motion sensor device according to a first preferred embodiment of the invention.

FIG. 1 shows a first preferred exemplary embodiment of a motion sensor device according to the present invention in the form of a schematic block diagram. Detector means 12 are provided in a housing, which is indicated with the border line 10 and suitably mounted on a wall, a ceiling or the like, and realized in the form of a high-frequency motion sensor device; detector means of this type in the form of high-frequency motion sensors are disclosed in DE 10 2012 103 177 A1 by the applicant, which with respect to the constructive realization of such a motion sensor device including the realization of the functional components according to FIG. 1 of this publication, the high-frequency hardware according to FIG. 2 of this publication and the signal processing functionality according to FIGS. 3, 4 of this publication, as well as the corresponding portions of the description, is incorporated into the disclosure of the present application by reference. Detector means designed in this fashion cooperate with signal processing and control means 14 that receive a distance signal a, as well as an angle signal phi, of a detection object located in a detection region in front of an exterior building surface 13 (the line shown in FIG. 1 also serves as reference line for a distance and angle measurement) from the high-frequency detector means 12. The signal processing and control means 14 are designed for activating a schematically illustrated lighting or lamp unit 11, namely when the device determines that an object to be detected is located within an adjusted or predefined boundary of the detection region as described in greater detail below.

For this purpose, the signal processing and control means feature detection region determining means 16, which in turn feature an interface unit 18. The detection region determining means cooperate with comparing means that allow this determination, namely whether a currently detected object (with assigned distance data (a) and angle data (phi)) is located in the predefined detection region, based on data that is stored in a storage unit 28 and describes a boundary of the detection region.

In the exemplary embodiment shown, a user can adjust and configure this detection region by actuating manual adjusting means 20 (wherein this control unit is described in greater detail below with reference to FIG. 3); in the exemplary embodiment shown, a mobile data processing unit 24 is also wirelessly connected to the interface unit 18 in addition to the control unit 20, wherein said data processing unit not only makes it possible to visually display or output a detection region with its current boundaries on a schematically illustrated touch-sensitive screen 26, but due to the touch-sensitive screen also represents an alternative adjustment option to the control dials of the unit 20, which are described in detail below, and once again allows an alternative manipulation of thusly pre-adjusted boundary shapes.

Figure 3:
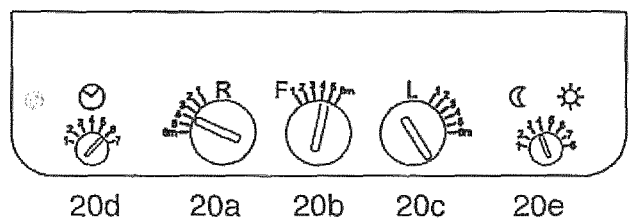
FIG. 3 shows a schematic representation of an exterior surface of a user interface, which faces a user, as well as rotary adjusting knobs provided thereon.

According to the embodiment illustrated in FIG. 1 and FIG. 3, it is concretely proposed that the boundary of the detection region for the sensor means 12 can be adjusted by means of three control dials 20a, 20b, 20c that are actuated manually; accordingly, this control unit 20 is arranged at a suitable and externally accessible location on the housing or underneath a cover that can be respectively opened or removed. In other respects, the additional control dials 20d and 20e respectively represent known individual options for adjusting an activation period of the lighting unit 11 (20d) and for realizing a dimmer switch functionality (20e) for a brightness threshold of the activation of the lighting unit 11 in order to prevent an activation of this unit 11 if the ambient brightness level makes it unnecessary to activate the lighting unit 11, namely even if an object is detected in the detection region.

The inventive adjustment or definition of the detection region in the preferred exemplary embodiment featuring three control dials is described below with the respectively associated dimensions based on the exemplary variations for adjusting the boundary of the detection region illustrated in FIGS. 2a-2d. In this case, the diagrams according to FIGS. 2a-2d respectively show a top view of the plane of motion, in which a detection object moves; the housing 10 according to FIG. 1 was positioned in this plane of motion flush with the respective upper horizontal line and placed in the center such that the edge line 13 of the housing illustrated in FIG. 1 overlaps with the respective upper horizontal line in FIGS. 2a and 2d.

The control dials 20a, 20b and 20c now make it possible to adjust a first maximum detection width within this geometry along a first axis 30 that extends horizontally and toward the right in the plane of projection of FIG. 2, wherein the rotary control dial 20a (R=right) can in the exemplary embodiment shown be adjusted up to a maximum detection width of 6 m along the first axis 30, in this respect also in accordance with a scaling of the respective rotary control dials 20a-20d illustrated in FIG. 3. The second rotary control dial 20b (marked with the letter F=frontal) likewise makes it possible to adjust a frontal detection region up to a maximum detection width of 6 m along a second axis 32, which is directed downward in the plane of projection and defines an angle of 90° relative to the first axis 30. The third control dial 20*c*, which in this respect is assigned to a third axis 34 (L=left) that defines another angle of 90° relative to the second axis 32 and therefore an angle of 180° relative to the first axis 30, also allows the adjustment of a maximum detection width of 6 m. Accordingly, the exemplary embodiment proposes that a coverage angle of 180° is defined in the detection plane (=plane of motion of the detection object), wherein the semicircle illustrated in FIG. 2*a* is defined for the detection region if a maximum width of 6 m is respectively adjusted, in this respect, in accordance with the state adjusted in FIG. 2*a*. The boundary of the detection region accordingly extends between the hatched region—in which the detection and the activation of the consumer 11 take place—and the unmonitored outer region.

Figure 2A:
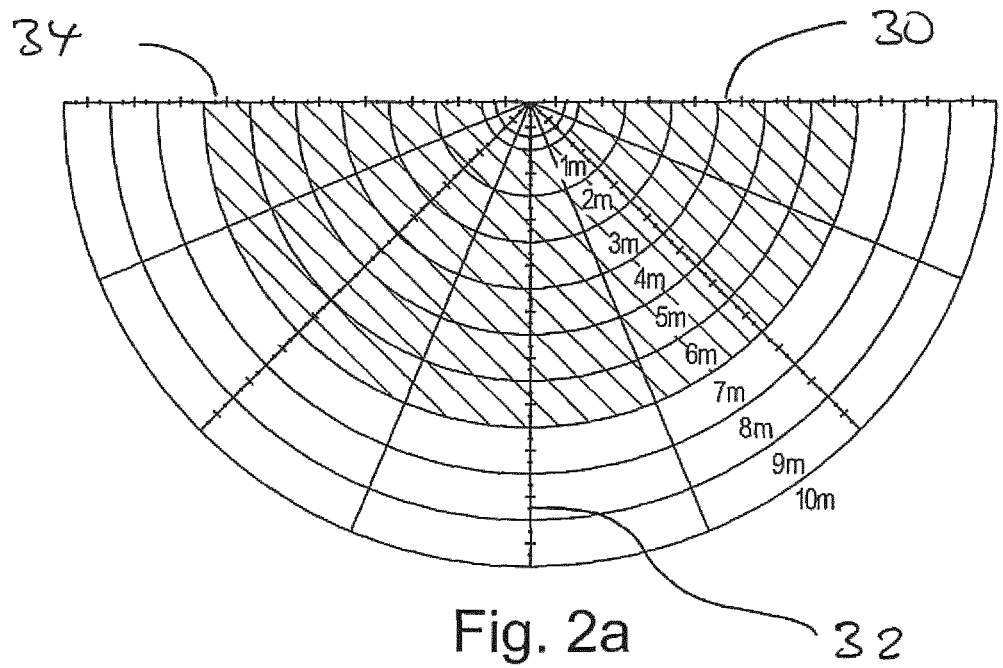
FIG. 2a to FIG. 2d show different variations in the adjustment of the detection region along three axes in the exemplary embodiment according to FIG. 1.
Figure 2B:
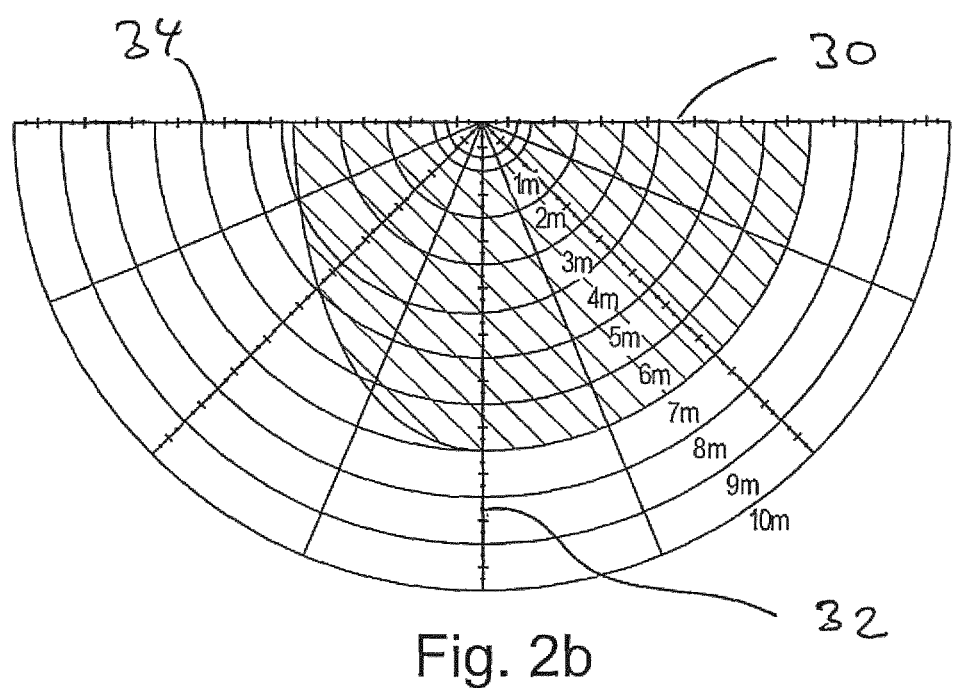

FIG. 2*b* shows an alternative adjustment of the control unit 20 in comparison with the illustration in FIG. 2*a* the control dials 20*a* and 20*b* are in this case still adjusted to a (maximum) width of 6 m whereas the adjusted detection width of the third control dial 20*c*, which in this respect corresponds to a distance along the axis 34 directed toward the left, amounts to slightly less than 3 m. In the geometric and computational processing by means of the inventive detection region determining means 16 that form part of the unit 14, this changed boundary shape is now determined such that an ellipse is defined by the respective axial adjustment (or the associated values adjusted by means of the control dials); the left half of FIG. 2*b* clearly shows the elliptical shape between the adjusted value 3 (of the control dial 20*c* along the axis 34) and the adjusted value 6 m of the control dial 20*b* along the axis 32. In FIG. 2*b*, the boundary of the detection region is accordingly characterized by two different arc shapes in the left and in the right region, which are continuously connected to one another.

Figure 2C:
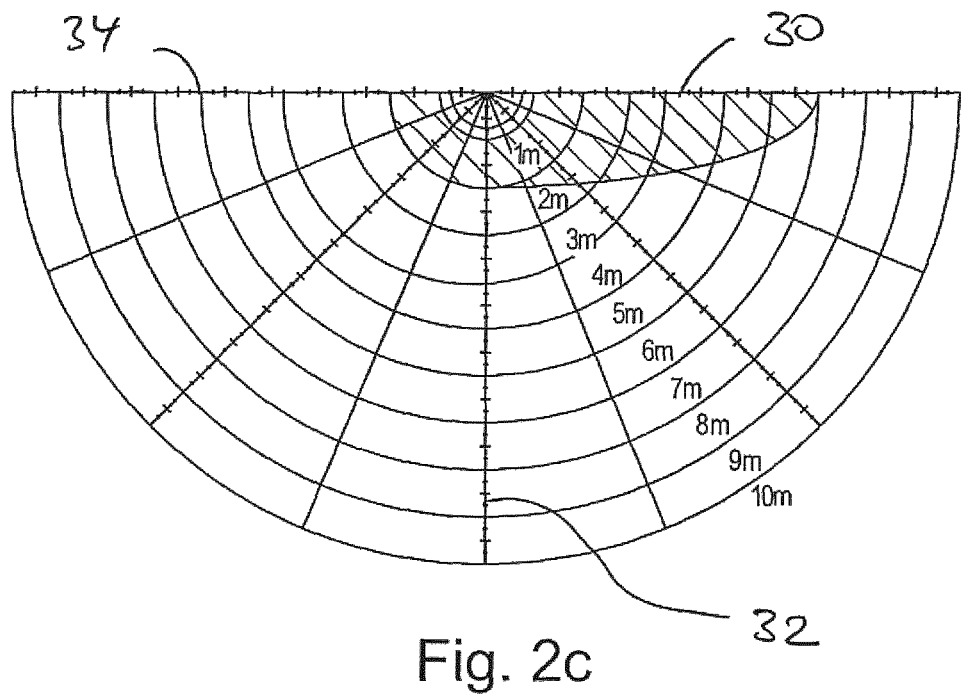
Figure 2D:
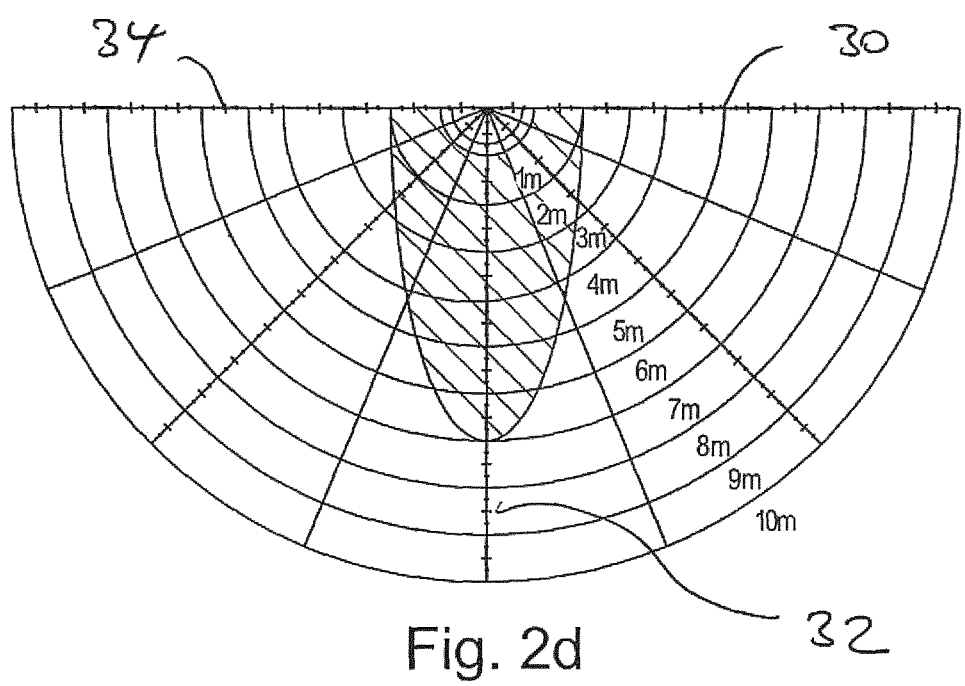

FIGS. 2*c* and 2*d* elucidate examples of other alternative configurations or adjustments: in configuration example 2*c*, for example, the device illustrated in FIGS. 1 and 3 is adjusted to a (in this case minimal) detection distance of 1 m along the axes 32 and 34 whereas a maximum distance of 6 m is adjusted along the axis 30; in this case, a narrow lobe is formed and directed toward the right as illustrated in FIG. 2*c*, wherein this figure also elucidates the elliptical shape in the right portion of the diagram according to FIG. 2*c* in comparison with the quadrantal arc shape in the left portion. FIG. 2*d* ultimately shows a configuration variation, in which only minimum detection widths of 1 m are respectively adjusted along the axes 30 and 34 (by the respectively assigned control dials 20*a* and 20*c*) whereas a detection width of 6 m is adjusted toward the front (by the control dial 20*b*) in order to form a narrow, forwardly directed detection region (i.e. with a detection maximum along the axis 32); in the configuration example illustrated in FIG. 2*d*, a double elliptical shape is formed toward each side (referred to the axis 32 as assumed frontal and central axis).

It becomes clear that the detection region of the sensor device can be adjusted in accordance with the respective situation in a highly flexible and highly selective fashion by means of only three control dials that can be easily and intuitively operated, wherein an region of 180° can be swept within a broad and typical detection angle (coverage angle) for many applications in the plane of motion. In this context, the presently described device is neither limited to this exemplary maximum coverage angle of 180° nor to the exemplary maximum distance values of 6 m (which can also be varied relative to one another with respect to their maximum) nor to the exemplary number of three axes, which are respectively arranged in the plane of motion at an angle of 90° relative to one another; with respect to the configuration, the designer has complete discretion to respectively realize suitable variations of this inventive fundamental principle.

The present invention is also not limited to the illustrated configuration of the individual arcs; not only can these arcs be hypothetically determined, calculated or defined differently, e.g. in the form of other—e.g. paraboloidal—arc shapes, but the invention alternatively or additionally also proposes to at least sectionally realize a boundary shape in the plane of motion in the form of linear sections, wherein curves may be defined adjacent to these sections or the boundaries of a detection region may alternatively also be completely defined by suitable linear segments or sections. For this purpose, the control dials shown or additional control dials may be designed for defining the positions of these sections, wherein the exemplary display unit 26 in the form of a screen with assigned data processing means allows a simple visual check of these adjustment options in accordance with an enhancement. Furthermore, another interface unit (which can be manually actuated or provided with predefined data or data sets) may alternatively or additionally allow the direct input of a boundary, for example, such that the user can define a detection region with its boundary on a map or similar representation of an region, which is displayed on a screen unit (e.g. 26), with a manual actuation, e.g. in the form of touch-type actuation or a gesture.

Although this is not illustrated in the exemplary embodiments, the invention alternatively or additionally proposes to provide the control unit 14 with suitable learning or set-up means such that this control unit can in a set-up mode store a continuously tracked motion signal of a (detection object in the form of a) person detected by the detector means 12 as boundary of the detection region and base a subsequent detection mode on this stored boundary; potential comparison data of a storage unit 25 would accordingly also be generated for the comparing means 22 in this case. However, this variation of the invention is also purely exemplary and can be varied or realized differently in accordance with the respective requirements.

The present invention is furthermore not limited to the exemplary lighting means identified by the reference symbol 11 in FIG. 1; in fact, the present invention can also be used as an alarm device or as a motion detector device for other observation, monitoring or control tasks, in which corresponding consumers or other units have to be activated.

The invention claimed is:

1. A motion sensor device for detecting a detection object in a detection region, with detector means (12) which are arranged in a sensor housing (10) and designed for detecting motions of the detection object, as well as for generating an electronic distance signal (a) and angle signal (phi) corresponding to the detection object, wherein the distance signal (a) corresponds to an instantaneous distance of the detection object from the sensor housing (13) and the angle signal corresponds to an instantaneous position angle (phi) of the detection object in the form of an azimuth angle in a plane of motion of the detection object extending parallel to the ground surface in the installed state of the motion sensor device on a wall and signal processing and control means (14) connected downstream of the detector means are designed for activating a device (11) to be connected downstream of the motion sensor device in dependence on the distance signal and the angle signal, and wherein the signal processing and control means feature detection region determining means (16) with an interface unit (18; 20), which can be adjusted, configured and/or actuated by a user and serves for at least sectionally adjusting and/or defining a boundary of the detection region in the plane of motion, wherein the signal processing and control means feature comparing means (22), which are designed for comparing a distance signal and angle signal generated for a detection object by the detector means with data on a predefined or adjusted boundary of the detection region that can be variably defined and/or adjusted relative to the sensor housing frontally (32) and laterally (30, 34) in the plane of motion, wherein display and/or visualization means (26) are assigned to the interface unit (18) in order to optically display and/or output the boundary.

2. The device according to claim 1, wherein the display or visualization means are designed for additionally displaying map elements inside and/or outside the detection region.

3. The device according to claim 1, wherein learning and/or set-up means are assigned to the interface unit such that a motion path of a person in the plane of motion is detected and stored as boundary of the detection region by the interface unit in a learning mode effected by means of the learning or set-up means.

4. The utilization of a motion sensor device according to claim 1 within a wall or ceiling light or for the activation of such a wall or ceiling light.

5. The device according to claim 1, wherein the detector means is a high-frequency detector means.

6. The device according to claim 1, wherein the interface unit is designed for adjusting a boundary of the detection region over a coverage angle of at least 150°, in the plane of motion and relative to the sensor housing.

7. The device according to claim 6, wherein the coverage angle is at least 170°.

8. The device according to claim 1, wherein the interface unit is designed and can be adjusted in such a way that the detection region boundary features in the plane of motion a first arcuate section with a first arc shape and a second arcuate section with a second arc shape that differs from the first arc shape.

9. The device according to claim 8, wherein the first and/or the second arc shape are realized in the form of a circular section, an elliptical section or a paraboloidal section.

10. The device according to claim 1, wherein the interface unit is designed and can be adjusted in such a way that the detection region boundary features at least one linear section in the plane of motion.

11. The device according to claim 10, wherein the detection region boundary features a plurality of linear sections, which are connected to one another in a rectangular or polygonal fashion referred to the sensor housing.

12. The device according to claim 1, wherein the interface unit features at least two adjusting means (20a, 20b, 20c) which can be manually actuated by the user and are designed for defining a maximum detection distance along a respectively assigned axis (30, 32, 34) extending from the sensor housing in the plane of motion or parallel thereto, wherein the at least two corresponding axes define an angle of at least 45° relative to one another in the plane of motion.

13. The device according to claim 12, wherein the at least two adjusting means comprises rotary knobs or slider buttons.

14. The device according to claim 12, wherein the angle is at least 70°.

* * * * *